United States Patent Office 2,933,542
Patented Apr. 19, 1960

2,933,542

DISPROPORTIONATION METHOD FOR PRODUCING MENTHENE-3

Joseph P. Bain and Wilbur Y. Gary, Jacksonville, Fla., assignors to The Glidden Company, Cleveland, Ohio, a corporation of Ohio No Drawing. Application April 30, 1953
Serial No. 352,293

6 Claims. (Cl. 260—675.5)

This invention relates to a novel process for preparing menthene-3 by partial hydrogen disproportionation of monocyclic methadienes selected from the class consisting of alpha terpinene, gamma terpinene, terpinolene, 2,4(8)-p-menthadiene, 3,8(9)-p-menthadiene and 2,4(5)-p-menthadiene, which class of compounds results from the acid isomerization of the pinenes, dipentene or their mixtures.

In the copending application of Bain, Fuguitt and Gary, Ser. No. 292,204, filed January 6, 1952, now U.S. Patent No. 2,741,645, complete disproportionation of terpene mixtures containing menthadienes is disclosed, the process there employing a novel nickel formate catalyst. A similar complete disproportionation using a copper-nickel catalyst is disclosed in the Palmer and Bibb U.S. Patent No. 2,211,432.

We have now found that such complete disproportionations proceed in roughly two stages when the mixture contains appreciable quantities of dipentene, the latter compound resisting reaction until substantially all of the other selected menthadienes have been converted to menthenes and cymene. When this conversion has occurred, the menthenes along with the accompanying dipentene are further converted and if the treatment is carried out until the latter reaction has been completed, the ultimate end products are p-cymene and menthane.

Our present invention is concerned with treatments wherein the disproportionation is terminated at or close to the end of the first stage mentioned above. At this stage, as indicated, substantially all of the selected menthadienes other than dipentene have undergone simultaneous hydrogenation and dehydrogenation and have been converted more or less to menthenes, with 3-p-menthene as the major product. By stopping the reactions at about this point, the 3-p-menthene can be removed and recovered. A more complete explanation of these generalizations is given hereinbelow, but the generalizations are here sufficiently accurate to elucidate the following objectives.

One object of the invention is to subject selected menthadienes to a controlled partial disproportionation in the presence of dipentene which is terminated when the treatment has produced about the optimum concentration of 3-p-menthene.

Another object is to provide a novel disproportionation treatment of mixtures of terpenes in which treatment the non-benzenoid unsaturation is reduced to between about 25% and 75% of the original unsaturation of the mixture depending on the composition of the raw material and depending on the proportion of unsaturated but inert materials present in the mixture.

A further object is to provide a novel synergistic process for converting mixtures of terpenes of the menthane series containing or not containing camphene and/or other terpenes such as pinenes which are more or less inert to this treatment into 3-p-menthene, then to remove and recover the 3-p-menthene, and thereafter, if desired, to completely disproportionate or dehydrogenate the remaining unsaturated terpenes mainly to cymene and menthane.

These and other objects will be understood from the following description of our invention.

We have found that selected menthadienes including terpinolene, α-terpinene, γ-terpinene, and the p-menthadienes $\Delta^{2,4(8)}$, $\Delta^{2,4(5)}$ and $\Delta^{3,8(9)}$ can be partially disproportionated catalytically to menthenes, with 3-p-menthene as a prominent member of the resulting products. When the selected menthadienes are contained in a mixture of terpenes along with dipentene (or its optically active form limonene), the partial disproportionation of the selected menthadienes to menthenes occurs almost completely before the dipentene begins to react. Accordingly, if the disproportionation treatment is stopped before the dipentene has reacted to more than a slight degree, the mixture will then contain about the maximum content of 3-p-menthene and of other menthenes, and the latter product(s) can be removed from the mixture and recovered. Accordingly, the present invention provides a novel process for preparing 3-p-menthene.

We have also found that various terpenes which may be present in a mixture of the selected menthadienes, such as camphene and alpha pinene, are innocuous and are substantially unaffected by the treatment. This makes it possible to treat directly by our process various commercial mixtures presently identified in commerce as "dipentenes." Such commercial "dipentenes" vary quite substantially in their chemical composition, and in fact, commercial "dipentenes" not defined otherwise as to composition are most accurately regarded only as mixtures of monocyclic terpenes which may or may not consist predominantly of true dipentene; i.e., 1,8-p-menthadiene. For example, the "dipentene" resulting from ordinary commercial fractionation of the hydrocarbons resulting from pine stump extraction ordinarily contains only around 45% to 55% 1,8-p-menthadiene. The commercial "dipentene" resulting from pine wood distillation may contain only about 20% to 30% 1,8-p-menthadiene. Commercial "dipentene" recovered as by-product from certain turpentine or dipentene processing, as for example manufacture of pine oil, terpin hydrate, camphor, etc. may contain 1,8-p-menthadiene (true, pure dipentene), to the extent of 50% to 70%, but in general such processes yield by-product "terpenes" suited to many commercial applications and which may even meet commercial specifications for "dipentene," but which are almost entirely lacking in true dipentene; namely, 1,8-p-menthadiene. Products of the latter type are particularly suited to our process since dipentene (1,8-p-menthadiene) does not engage in the initial disproportionations, and its transformation product(s) as produced by our process serve only as diluent(s).

Thus, if the product available for processing by our method is rich in pinenes and/or dipentene, we prefer to isomerize it further, as by heating it with acid catalysts such as 50% aqueous sulfuric acid or with a clay such as fuller's earth until the reaction mixture is poor in dipentene and pinenes and rich in the resulting isomerization products, terpinolene, gamma terpinene, alpha terpinene, 2,4(8)-p-menthadiene, 3,8(9)-p-menthadiene and traces of other suitable dienes such as 2,4(5)-p-menthadiene, but not to treat it to the txtent that substantial polymer, cymene, etc. is produced. Such product can be treated by our invention without further processing but it may be convenient to distill it fractionally to remove camphene, polymer, etc., the presence of which does not contribute favorably to the objects of our invention.

Our treatment involves mixing the selected menthadiene and/or mixture containing same, with a small amount of hydrogenation catalyst and then gently refluxing the mixed mass until the original non-benzenoid unsaturation has been reduced at least about 25% and at most about 75%, as measured by bromine titration. Such reduction of non-benzenoid unsaturation generally brackets extents of reaction which yield optimum or maximum contents of 3-p-menthene in the reaction mass. Preferably, however, the course of the treatment is followed analytically, as by spectrochemical methods, and the treatment is stopped when the 3-p-menthene content is about its maximum. The treatment can be stopped by simply cooling the mass quickly to below reaction temperatures. If subsequent fractionation temperatures are above the catalytic reaction temperatures, the catalyst is removed from the cooled mass in any desired way, as by decantation or filtration, after which the partially disproportionated material can be distilled to remove one or more fractions rich in 3-p-menthene. If one or more desired fractions can be removed by distillation at temperatures below the catalytic reaction temperatures, then it is not necessary to remove the catalyst before subjecting the disproportionated material to fractional distillation. The residue not retained for its 3-p-menthene content and rich in cymene can then be further disproportionated, if desired, to convert the unsaturates therein to cymene and menthane. The distilled fraction(s) rich in 3-p-menthene can be further fractionated, if desired, to give 3-p-menthene of good purity. In general, substantial amounts of 2-p-menthene are also produced and since this menthene boils within a few tenths of a degree of the boiling point of 3-p-menthene, it is not separable by distillation economically. Fortunately, the reactions for which 3-p-menthene are particularly valuable are selective between the two menthenes and one of the menthenes usually serves as an inert diluent. The reaction products of say 3-p-menthene are readily separable from the unreacted 2-p-menthene.

Various catalysts can be used in our partial disproportionation, but the most effective ones are the usual hydrogenation catalysts, such as Raney nickel, commercial nickel hydrogenation catalysts such as those employed in reduced form and are usually shipped in oil, the copper-nickel catalyst of U.S. Patent No. 2,211,432, or the nickel formate catalyst of U.S. Patent No. 2,741,-645 supra. Palladium catalyst, such as 5% palladium on carbon, is particularly suitable since this catalyst in small amounts accomplishes our objective but fails to cause complete disproportionation to cymene and menthane rapidly and therefore there is time for control of the reaction mixture and for stopping the reaction at optimum 3-p-menthene content. Various catalysts give minor variations in the yields of 3-p-menthene, and some give reaction rates which are easier to control than are those of other catalysts. Amounts of catalyst over about 5% by weight of the terpene mass being treated is seldom needed, and amounts between about ½% and 4% are generally preferred if nickel is used. Much smaller quantities of platinum and palladium are effective.

The treatment can be carried out in the presence of solvents if desired, but this is generally unnecessary though if better control of the reaction is required, the reaction products of a prior treatment are particularly useful (see Example 8).

The following examples illustrate the principles of our invention and include the best methods now known to us for carrying out those principles.

*Example 1*

There is shown below a table of compounds which are involved in this invention either as raw material or as materials present in the treated mass. Camphene and any cymene present in the raw material are inert. The desirable components of the raw materials are the menthadienes other than dipentene. Desirable products in the treated mass are the menthenes and cymene.

| Compound: | B.P. at 100 m., °C. |
| --- | --- |
| Camphene | 92 |
| 3-p-menthene | 101 |
| 2-p-menthene | 101 |
| Trans-p-menthane | 103.5 |
| 2,4(5)-p-menthadiene | 105 |
| Alpha terpinene | 107 |
| Cis-p-menthane | 108 |
| Dipentene | 110 |
| Cymene | 110 |
| 4(8)-p-menthene | 110 |
| 3,8(9)-p-menthadiene | About 115 |
| Gamma terpinene | 115.5 |
| 2,4(8)-p-menthadiene | About 119 |
| Terpinolene | About 119 |

A quantity of suitable crude menthadiene mixture containing only about 20% dipentene and 5% camphene was mixed with 5% of commercial nickel formate and was heated to cause refluxing. The course of the reaction was followed spectrographically, and after 12 hours of heating, the mass was found to contain 35% 3-p-menthene, a little 2-p-menthene, cymene, 4(8)-p-menthene, 1-p-menthene, di-pentene, and small amounts of the two menthanes. All conjugated dienes and all non-conjugated dienes except dipentene had at this point disappeared with formation of the menthenes and cymene. The camphene remained unchanged. The mass was quickly cooled and removed from the apparatus, after which a small portion was returned to the apparatus and again heated to cause further disproportionation. This further treatment converted the dipentene, but also caused the conversion of 3-p-menthene to menthane and cymene.

From the foregoing description it is apparent that camphene, dipentene and cymene do not contribute to the formation of 3-p-menthene when a mixture containing them is partially disproportionated. The following examples indicate the effects of like treatments on various other terpene compounds.

The mass of material which had been partially disproportionated above, was filtered to remove the catalyst, and was then fractionated to remove a 3-p-menthene concentrate. The fraction boiling higher than 3-p-menthene and which was quite rich in cymene was further disproportionated with the same catalyst (that which was separated from the mass prior to removal of 3-menthene) to remove remaining non-benzenoid unsaturation, and the resulting material was fractionated to menthane and cymene.

*Example 2*

Four liters of citrus d-limonene (a commercial product) was fractionated through a 2 x 30 inch Stedman column at 100 mm. pressure with reflux ratio 10:1. The fraction of pure d-limonene with boiling range 108.8° C.–109.5° C. ($n_D^{25}$ 1.4708) was used in the following experiment.

384 g. of the above-mentioned fraction was heated with 4% of commercial nickel formate (as received from Harshaw Chemical Co.) to cause gentle refluxing. The catalyst started to become active after about 3 hours, and disproportionation (and dehydrogenation, as was evident from the results) proceeded smoothly. From previous calculations, it had been found that if the reactions proceeded stepwise to p-cymene and menthene-8,9 as proposed by Eschanazi and Bergmann (J.A.C.S. 72,5651, 1950), complete disproportionation would give a bromine value corresponding to 25% of that possessed by the starting limonene. Since other experiments performed by us had shown that the reaction did not proceed in that manner, it was decided that the here-described treatment should be stopped at a bromine value corresponding to about ⅓ of that possessed by the limonene. This was done and the product showed $a_D^{25}$ 24.3° (10 cm. tube). The gas released during the treatment up to the said stopping point was measured and found to be .988 mole, and after the treatment had been stopped by cooling the mass quickly, the treated mass was found by spectrographic analyses to contain 58% cymene and 23.6% unreacted limonene. The reacted mixture was then fractionated and the fractions examined by infrared spectroanalyses. The first three fractions representing 12% of the sample showed a possible trace of 3-p-menthene, but the presence of limonene prevented its estimation. The various fractions were next treated with 3% commercial benzene sulfonic acid at 100° C. to 125° C. to remove the limonene and isomerize any 8(9)-p-menthene (which boils at about 102° C. to 103° C. at 100 mm.) to 3-p-menthene. The total quantity of 3-p-menthene then calculated by infrared spectroanalysis was only 2% of the original mass of material. Since 8(9)-p-menthene is known to be converted to 3-p-menthene by the acid type isomerization employed, it is evident that the presence of dipentene or limonene in our raw materials does not contribute to any extent to the accomplishments of our objectives.

*Example 3*

Gamma terpinene was easily disproportionated by refluxing with 4% nicked formate. Due to the high pot temperature during reflux caused by the high boiling point of the gamma terpinene, the catalyst became active in about one-third the time required with limonene. Almost all of the gamma terpinene was used up before 3-p-menthene began to decrease. There was about half as much 1-menthene formed as 3-p-menthene. A maximum 3-p-menthene concentration of 19% was reached.

When the catalyst was re-used with a fresh batch of gamma terpinene in the same proportion, the reaction began immediately on reaching 175° C. and then continued at about twice the speed of the first run. A maximum 3-p-menthene concentration of 15% was reached. During this second run, the gas escaping was measured and amounted to half of that which should be produced in forming the cymene found present. The hydrogen equivalent of the other half of the cymene was accounted for by the formation of menthenes.

*Example 4*

Pure alpha terpinene was disproportionated by refluxing it with 5% nickel formate. The reaction was considerably slower than with the higher boiling gamma terpinene but otherwise was quite satisfactory. In 7.3 hours, the infrared spectrum on the reaction mixture indicated 25% 3-p-menthene. By further reaction, the menthene was destroyed and 85% p-cymene was obtained. A second disproportionation using the catalyst filtered out of the first run and using fresh alpha terpinene resulted in a rapid reaction. To follow the course of the reaction samples were withdrawn during the reaction; the highest 3-p-menthene concentration found therein was 17%, but since the speed of the reaction interfered with taking enough samples, there may have been a higher yield between the samples which were secured. At the end of the reaction the mixture was found to contain 75% cymene, which was appreciably less than in the first reaction. In both cases, the spectra indicated only p-menthane in addition to p-cymene at the end of the reaction.

*Example 5*

Terpinolene was obtained in moderately pure form by fractional distillation of a mixture of terpene monocyclics produced by a mild catalytic isomerization of turpentine.

By refluxing such terpinoline with 5% fresh nickel formate, the catalyst became active in about 1.5 hours, and produced 25% 3-p-menthene in 3.2 hours. Complete disproportionation produced 80% cymene.

In a second use of the same catalyst in the same percentage, a maximum of 21% 3-p-menthene was reached in about 10 minutes, and a maximum of 75% cymene was reached in 1.5 hours.

*Example 6*

A terpene mixture produced by dehydrating 3-p-menthene glycol was fractionated to give cuts rich in 2,4(8)-p-menthadiene and these cuts were refractionated in a 2" x 5' Stedman column at 100 mm. pressure with reflux ratio of 20:1. The purified 2,4(8)-p-methadiene had a constant boiling point of 120.5° C. at 100 mm. and successive cuts composing the bulk of material had identical infrared spectra. Portions of this pure material were used in the following tests.

A portion was mixed with 5% fresh nickel formate and the mixture was heated to cause refluxing. The pot temperature remained at 190° C. for a little over one hour during which there was practically no change in the menthadiene as indicated by infrared spectrum. By the end of two hours the catalyst had become active as shown by its change to a black color and the infrared spectra indicated that reaction had started. Spectra were run at progressive intervals during the reaction. 2-, 3,-, and 4(8)-p-menthenes were all detected but no one of these at any time was present in high enough concentration to warrant the commercial use of this procedure for its specific preparation. The maximum 3-p-menthene concentration which was reached was about 15%; the maximum for the other menthenes was considerably less. At the completion of disproportionation, there was 86% p-cymene present.

*Example 7*

The following tabulation illustrates the use of various catalysts in the partial disproportionation of alpha terpinene and various mixtures of menthadienes produced by acid type isomerization of turpentine and containing little dipentene. These mixtures are designated by the symbols CD, CD-A, CD-B, etc. CD-A and CD-B were drawn from a commercial column near the middle of different monocyclics distillations A and B respectively. CD-2 was drawn from a commercial monocyclics distillation about ½ hour after the distillation commenced, and CD-6 was drawn about ½ hour before the distillation ended. CD-F and CD-N were taken from commercial production of monocyclics produced by catalytic turpentine isomerization. All materials were distilled shortly before the treatment shown in the table. The treatments were conducted at temperatures giving gentle reflux.

The catalysts used were:

Nickel formate—commercial grade
Newport—a copper-nickel catalyst of the type described in U.S. Patent No. 2,211,432
"C"—a commercial reduced nickel catalyst prepared in unhardened vegetable oil.

| No. | Raw Material | Catalyst | Percent Catalyst | Bromine Titre | | Percent Reduction | Percent 3-p-Menthene |
| --- | --- | --- | --- | --- | --- | --- | --- |
| | | | | Original | Final | | |
| 1 | CD-2 | Ni Formate | 4.0 | 19.8 | 10.3 | 48 | 11.5 |
| 2 | CD-2 | do | 4.0 | 19.8 | 4.75 | 76 | 9.0 |
| 3 | CD-2 | do | 4.0 | 19.8 | 3.4 | 83 | 8.3 |
| 4 | CD-2 | above reused | | 19.8 | 7.5 | 62 | 7.7 |
| 5 | α-terp.¹ | Ni Formate | 4.0 | 20.5 | 8.2 | 60 | 13.0 |
| 6 | α-terp.¹ | above reused | | 20.5 | 6.9 | 66 | 16.1 |
| 7 | CD-F | Ni Formate | 4.0 | 20.5 | 11.9 | | 18.0 |
| 8 | CD-F | do | 4.0 | 20.5 | 10.7 | | 18.0 |
| 9 | CD-F | do | 4.0 | 20.5 | 9.5 | | 21.5 |
| 10 | CD-F | above reused | | 20.5 | 10.3 | | 18.0 |
| 11 | CD-F | do | 4.0 | 20.5 | 10.0 | | 27.7 |
| 12 | CD-F | do | 4.0 | 20.5 | 9.3 | | 24.1 |
| 13 | CD-F | do | 4.0 | 20.5 | 8.8 | | 28.0 |
| 14 | CD-F | do | 4.0 | 20.5 | 10.2 | | 23.0 |
| 15 | CD | do | 4.0 | 20.5 | 10.0 | | 17.0 |
| 16 | CD-A | Newport | 3.0 | 15.5 | 3.9 | 75 | 6.4 |
| 17 | CD-B | do | 5.0 | 19.5 | 12.0 | 38 | 8.5 |
| 18 | CD-6 | do | 4.0 | 22.0 | 9.0 | 59 | 14.7 |
| 19 | CD-6 | do | 4.0 | 22.0 | 7.0 | 68 | 9.7 |
| 20 | CD-6 | do | 3.0 | 22.0 | 11.7 | 47 | 7.1 |
| 21 | CD-2 | do | 2.0 | 19.8 | 7.9 | 60 | 12.3 |
| 22 | CD-2 | do | 2.0 | 19.8 | 5.1 | 74 | 13.4 |
| 23 | CD-2 | do | 2.0 | 19.8 | 3.3 | 83 | 10.8 |
| 24 | α-terp.¹ | do | 2.0 | 21.0 | 7.7 | 63 | 11.7 |
| 25 | α-terp.¹ | do | 2.0 | 21.0 | 6.1 | 71 | 11.0 |
| 26 | α-terp.¹ | above reused | 2.0 | 21.0 | 7.1 | 66 | 10.2 |
| 27 | α-terp.¹ | do | 2.0 | 21.0 | 6.3 | 70 | 8.1 |
| 28 | CD-N | Newport | 3.0 | 19.8 | 8.6 | 56 | 8.0 |
| 29 | CD-6 | Drew "C" | 1.0 | 19.7 | 10.8 | 45 | 16.5 |
| 30 | CD-6 | do | 1.0 | 19.7 | 10.3 | 48 | 15.0 |
| 31 | CD-6 | do | 1.2 | 19.7 | 8.2 | 58 | 8.2 |
| 32 | CD-2 | do | 0.75 | 19.8 | 10.2 | 48 | 20.0 |
| 33 | CD-2 | do | 1.5 | 19.8 | 9.1 | 54 | 18.3 |
| 34 | α-terp.¹ | do | 0.5 | 21.0 | 8.1 | 61 | 16.2 |
| 35 | α-terp.¹ | do | 1.0 | 21.0 | 7.3 | 65 | 16.0 |
| 36 | CD-2 | do | 1.0 | 20.3 | 9.0 | 56 | 15.8 |
| 37 | CD-2 | do | 1.0 | 20.3 | 7.3 | 64 | 17.9 |

¹ α-Terpinene.

In each of the runs shown in the table, the reaction was carried out until the indicated final bromine value had been reached. This value was determined in the following manner:

Dissolve 20.0 cc. liquid bromine in glacial acetic acid and dilute to 1000 cc. with more acid. To 5 cc. of chloroform in a small Erlenmeyer flask add 1.00 cc. of the terpene sample. Titrate with the bromine solution until the addition of 0.1 cc. produces an orange color which persists for at least 15 seconds. Record the titration figure. The percent reduction (in bromine titre) is then determined by subtracting the titration after the reaction from the titration of the sample before the reaction and calculating this value as a percent of the original titration.

The 3-p-menthene was calculated from the infrared spectra, using the absorption at $896/(cm.^{-1})$ and using as standard a highly purified sample.

All the catalyst and all the menthadienes may be combined at one time to produce a reactive system capable of yielding the partially disproportionated product, or in order to maintain more certain and absolute control over the exothermic reaction, part of the catalyst and part of the terpene may be first reacted or partly reacted and then additional catalyst and additional terpene may be added and reacted either continuously or stepwise. This procedure may be continued until a large charge of material is accumulated in the kettle. Thus, the first reaction mixture serves to dilute the subsequent reactive masses added to the vessel and large reacted masses are accumulated with safety. Details of such a reaction are described in the following example.

Example 8

A distillate fraction from a mixture of the hydrocarbons obtained by the acid isomerization of turpentine, containing approximately:

24% alpha terpinene
22% gamma terpinene
26% 2,4(8)-p-menthadiene
2% 3,8(9)-p-menthadiene
5% terpinolene
4% limonene
2% camphene
1% cymene was collected. To 9000 parts by weight of this terpene mixture in a carefully cleaned reaction vessel equipped with a reflux condenser, heating and cooling coils, was added one part of a catalyst consisting of 5% palladium on powdered charcoal. The mixing was done under an atmosphere containing more than 50% carbon dioxide to avoid possibility of ignition of the terpenes by the catalyst. The mixture was heated cautiously to reflux at about 175° C. Considerable heat is evolved in this reaction, so cooling coils were used to moderate the reflux, but not stop it at any time. This catalyst may cause ignition of organic compounds with air that may be drawn back into the kettle if reflux is stopped. As the reaction subsided as measured by drop in reflux rate, cooling was discontinued and heating was resumed to maintain reflux. After six hours, the reaction was nearly complete as shown by infrared analysis which showed the presence of over 25% 3-p-menthene and about 35% cymene as well as by the bromine value which was now only about half that shown by the starting mixture. One and a half parts of additional catalyst was added in the form of a very thin slurry in unreacted terpene, by means of a pump, followed by slow addition, over a period of three hours, of 11,000 parts of terpene and without interrupting the reflux. After three hours of reaction, another addition was made of one and a half parts of catalyst, followed by 14,000 parts of fresh terpene mixture added over a four hour period. After twelve hours of reaction, the product contained approximately 38% cymene
28% 3-p-menthene
6% 2-p-menthene
4% 1-p-menthene
1% 8(9)-p-menthene
1% 4(8)-p-menthene with some of the unchanged starting materials still present.

The progress of the reaction was followed by observing the optical absorption of the terpene mixture at the appropriate wavelengths in the infrared region of the spectrum. As the concentration of a compound changes, the strength of its absorptions or optical density changes correspondingly. The wavelengths for determination of the components dealt with here are as follows:

| | |
|---|---|
| Alpha terpinene | 12.05μ. |
| Gamma terpinene | 10.5 or 12.74μ. |
| 2,4(8)-p-menthadiene | 13.62μ. |
| 3,8(9)-p-menthadiene | 11.35 or 12.15μ. |
| Terpinolene | 12.02 or 12.57μ. |
| Limonene | 10.92 or 11.27μ. |
| Camphene | 11.4μ. |
| Cymene | 12.28 or 13.84μ. |
| 3-p-menthene | 11.12μ. |
| 2-p-menthene | 13.7–13.8μ. |
| 1-p-menthene | 8.62 or 12.5μ. |
| 8(9)-p-menthene | 12.33μ. |
| 4(8)-p-menthene | 8.1μ. |

Minor constituents are more readily determined if a preliminary distillation is used to separate the original complex mixture into several simpler mixtures. For the purpose of following the reaction, it is sufficient to watch the disappearance of the terpinenes and 2,4(8)-p-menthadiene bands and the appearance of 3-p-menthene, or alternatively, to follow the decrease in non-benzenoid unsaturation of the mixed reactants as by bromine value determination. During early stages of the reaction decrease in bromine value is fairly rapid but with palladium catalyst of the type and quantity employed here, the reaction tends to stop at the desired menthene stage and not be further converted to cymene and p-methane.

The product was fractionated in a bubble cap column having 75 plates, using a head pressure of about 300 mm., and a 300 mm. pressure differential between head and pot. The reflux ratio was varied from 10 to 20:1 and close analytical control (optical) of the product was maintained. The first five percent of the charge contained the bulk of the camphene, and the next forty-five percent contained the bulk of the 3-p-menthene in concentrations up to about 67%. The distillate was collected in small fractions. The first of these, containing considerable camphene, and the later ones containing considerable cymene, require further distillation. Such further distillation yields 3-p-menthene containing some 2-p-menthene but the product is suited to manufacture of menthol and related products.

It appears from the foregoing examples and discussion of the invention that menthadiene mixtures can be made to yield more 3-menthene and other menthenes that can be accounted for on the basis of available data on disproportionation of the pure menthadienes. This indicates that the differences, though not great, in the behavior of the individual terpenes with respect to hydrogenation and dehydrogenation phenomena serve to produce a synergistic effect as to menthene production.

Having now described our invention, what we claim is:

1. In a process for recovering 3-p-menthene, the steps comprising: partially disproportionating a feed material rich in at least one menthadiene of the class consisting of alpha terpinene, gamma terpinene, terpinolene, 2,4(8)-p-menthadiene, 3,8(9)-p-menthadiene, and 2,4(5)-p-menthadiene, said disproportionating being effected solely by heating said feed material under gentle refluxing conditions with about 0.5–5% of hydrogenation catalyst until the non-benzenoid unsaturation of the said feed material due to said menthadienes has been reduced by about 25% to 75%; terminating the disproportionation approximately by the time the maximum content of 3-p-menthene in the treated mass begins to diminish; and subsequently fractionating the mass to recover a fraction enriched in 3-p-menthene.

2. The process as claimed in claim 1 wherein the hydrogenation catalyst is palladium catalyst.

3. In a process for recovering 3-p-menthene, the steps comprising: partially disproportionating a feed material rich in at least one menthadiene selected from the class consisting of alpha terpinene, gamma terpinene, terpinolene, 2,4(8)-p-methadiene, 3,8(9)-p-menthadiene, and 2,4(5)-p-menthadiene, said feed also containing 1,8(9)-p-menthadiene; said disproportionating being effected solely by heating said feed material under gentle refluxing conditions with about 0.5–5.0% of hydrogenation catalyst until the non-benzenoid unsaturation of the said feed material due to said menthadienes has been reduced by about 25% to 75%, terminating the disproportionation approximately by the time the maximum content of 3-p-menthene in the treated mass begins to diminish and before said 1,8(9)-p-menthadiene begins to react whereby it remains substantially unchanged by the disproportionating treatment, and fractionating the mass to recover a fraction enriched in 3-p-menthene.

4. The process as claimed in claim 3 wherein the hydrogenation catalyst is palladium catalyst.

5. The process as claimed in claim 3 wherein said feed material is a mixture of the hydrocarbons obtained by the acid isomerization of turpentine.

6. The process as claimed in claim 5 wherein the hydrogenation catalyst is palladium catalyst.

References Cited in the file of this patent

UNITED STATES PATENTS

| | | |
|---|---|---|
| 2,211,432 | Palmer et al. | Aug. 13, 1940 |
| 2,402,493 | Greensfelder et al. | June 18, 1946 |
| 2,420,749 | Ipatieff et al. | May 20, 1947 |
| 2,526,895 | Pines et al. | Oct. 24, 1950 |

OTHER REFERENCES

Chemical Abstracts, vol. 26 (1932), page 1601[5], article by Grassi.

Smith et al.: Jour. Am. Chem. Soc., vol. 71, pp. 3765–9 (1949).

Eschanazi et al.: J. Am. Chem. Soc., vol. 72, pages 5651–4 (1950).